(12) United States Patent
McConnell

(10) Patent No.: US 8,550,383 B2
(45) Date of Patent: Oct. 8, 2013

(54) AUTOMATIC SWITCHING DIRECTIONAL NOZZLES IN IRRIGATION SYSTEMS

(76) Inventor: Ryan Layne McConnell, Dix, NE (US)

( * ) Notice: Subject to any disclaimer, the term of this patent is extended or adjusted under 35 U.S.C. 154(b) by 590 days.

(21) Appl. No.: 12/821,112

(22) Filed: Jun. 22, 2010

(65) Prior Publication Data

US 2011/0309171 A1    Dec. 22, 2011

(51) Int. Cl.
    *B05B 3/00*    (2006.01)
(52) U.S. Cl.
    USPC ............ 239/726; 239/69; 239/443; 239/536; 239/728; 239/737; 239/743; 239/DIG. 15
(58) Field of Classification Search
    USPC ............ 239/67, 69, 100, 443, 444, 536, 550, 239/565, 726, 728, 735, 737, 743, DIG. 15
    See application file for complete search history.

(56) References Cited

U.S. PATENT DOCUMENTS

| | | |
|---|---|---|
| 3,448,927 A | 6/1969 | Blair |
| 3,669,355 A | 6/1972 | Jurgens |
| 4,073,309 A | 2/1978 | Fraser et al. |
| 4,405,085 A | 9/1983 | Meyer |
| 4,735,365 A * | 4/1988 | Smeller et al. ............... 239/735 |
| 4,763,836 A | 8/1988 | Lyle et al. |
| 5,421,514 A | 6/1995 | McKenry |
| 5,505,386 A | 4/1996 | Stone |
| 5,586,728 A | 12/1996 | McKenry |
| 6,116,527 A | 9/2000 | Granger et al. |
| 6,343,749 B1 | 2/2002 | Thom |
| 2006/0118662 A1 | 6/2006 | Korus |

* cited by examiner

*Primary Examiner* — Steven J Ganey
(74) *Attorney, Agent, or Firm* — Samuel M. Freund; Cochran Freund & Young LLC

(57) ABSTRACT

Directional spray heads on each side of each tower over the wheels spray water behind the trailing wheel and not in front of the wheels. A control box activates the direction of travel of the wheels at the towers through a tower box at each tower. Solenoids wired to the tower box for switching power alternately to each wheel, switch the water flow via the solenoids to directional spray sprinklers spraying behind the trailing wheel.

4 Claims, 3 Drawing Sheets

AUTOMATIC SWITCHING DIRECTIONAL NOZZLES IN IRRIGATION SYSTEMS

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to mobile pivot irrigation systems and particularly to an auto dry track directional spray device which has directional spray heads on each side of each support tower in a center-pivot sprinkler over the wheels so when the pivot irrigation system changes direction, the auto dry track directional spray device switches the spray heads automatically to be used over the wheels so the wheels are always traveling over dry soil with the water sprayed behind the wheels; alternately the auto dry track directional spray device may be used with a linear mobile irrigation system.

2. Description of Related Art Including Information Disclosed Under 37 CFR 1.97 and 1.98

Irrigation systems comprising center-pivot sprinklers and linear movement sprinklers generally have one or more large main pipes or beams supported by one or more support towers with a series of spaced 360 degree spray heads along the length of the main pipes, including over the wheels. These sprinkler systems use large wheels to enable movement through an irrigated field. Each tower generally has two tires, one trailing the other. Due to the weight of the overhead sprinkler system and the softness of the wet ground caused by the 360 degree sprayers, the wheel tracks can become deep ruts, occasionally causing the sprinkler system to get stuck, and causing difficulty in harvesting crops.

In linear systems it is necessary to provide two directions of travel to go back and forth over the field. In center-pivot irrigation systems, it is also desirable to provide irrigation systems with two directions of travel required due to terrain or obstacles in the field.

While the prior art has made some provisions for not spraying in front of the wheels, the prior art primarily shows systems with only one direction of travel or systems with two directions of travel which require manual switching upon changing direction.

U.S. Pat. No. 5,505,386, issued Apr. 9, 1996 to Stone, describes a replacement drop sprinkler assembly for connection to an irrigation conduit of a center pivot irrigation system adjacent a tower support of the system includes a fluid conduit having first and second ends, the first end for fluid communication with an irrigation conduit of a center pivot irrigation system. The replacement drop sprinkler assembly projects water forwards or rearwards of the irrigation tower wheels, depending on the direction the irrigation system is traveling, while preventing substantial amounts of water from accumulating on the wheel surfaces and assists in the prevention of deep wheel ruts caused by irrigation system wheels tracking through newly formed mud.

U.S. Pat. No. 3,669,355, issued Jun. 13, 1972 to Jurgens, shows an irrigation apparatus which is self-propelled generally transversely across the ground, and in which the sprinkling or water distribution operation takes place rearwardly of the water supply pipe whereby to prevent undue wetting of the ground in the area of the self-propelling wheels whereby to provide good traction of the apparatus in the self-propelling operation.

U.S. Pat. No. 6,116,527, issued Sep. 12, 2000 to Granger et al, is for a center-pivot irrigation rut prevention device for installation in a conventional center-pivot irrigation system commonly found in agriculture which prevents ruts caused by the movement of the wheels in the drive mechanism of the irrigation system by re-directing the flow of water from the front of the drive mechanism of the irrigation system to the rear of the system thus enabling the wheels of the drive mechanism to travel of dry soil instead of freshly irrigated soil in the field. The invention consists of water pipe, quick connect attachments, a reciprocating sprinkler head, support struts and connecting ports for the drop lines supplied by the center-pivot irrigation system nearest the drive mechanism of the irrigation system.

U.S. Pat. No. 6,343,749, issued Feb. 5, 2002 to Thom, discloses a mobile drip irrigation system which includes an existing mobile irrigation system with the sprinkler heads removed and drip lines connected to the locations of the removed sprinkler heads. Each drip line includes a drop line extending from the irrigation system supply pipe, generally vertically to a lower end spaced slightly above the ground. The mobile drip irrigation system eliminates water being sprayed in the tracks of the wheels of the mobile towers.

Two U.S. Pat. Nos. 5,421,514 issued Jun. 6, 1995 and 5,586,728 issued Dec. 24, 1996 to McKenry, provide a preplant soil treatment method and apparatus. In FIG. 5, McKenry shows short dripper hoses of sufficient length which are attached to small manifolds and pulled behind the wheels in order to drench the area close to the wheel structures themselves. This prevents the wheels from being bogged down by soggy soil from the sprinklers. Minor adjustments in the attachment of the hoses may be made to allow this embodiment to be used in wheel line irrigation systems as well. McKenry also mentions a portable apparatus for pre-planting soil treatment consisting of a series of downwardly-pointing sprinklers which may be attached or added behind an existing center-pivot irrigation system or added behind an existing linear irrigation system.

U.S. Pat. No. 3,448,927, issued Jun. 10, 1969 to Blair, claims an irrigation spray line having central pipe flanked by two side pipes. Spray outlets are arranged so that such outlets are normally on the trailing side.

In irrigation systems which travel in two directions, both center-pivot and linear systems, what is needed is a two-sided directional sprinkler system in each tower which automatically switches sprinklers when the irrigation system changes directions so that the water from the directional sprinklers always falls behind the wheels to allow the wheels to travel over dry soil and prevent ruts.

BRIEF SUMMARY OF THE INVENTION

An object of the present invention is to provide a two-sided directional sprinkler system in each tower which automatically switches sprinklers when the irrigation system changes directions so that the water from the directional sprinklers always falls behind the wheels to allow the wheels to travel over dry soil and prevent ruts in irrigation systems which travel in two directions, both center-pivot and linear systems.

In brief, the auto dry track directional spray of the present invention has directional spray heads on each side over the wheels. When the pivot irrigation system changes direction, the invention switches the spray heads to be used over the wheels so the wheels are always traveling over dry soil with the water sprayed behind the wheels. In FIG. 1, when the irrigation structure is traveling in the A direction, the directional spray nozzles 20B on the B side automatically spray so that the water is sprayed behind the direction of travel of the wheels and both wheels are traveling over dry soil before it is sprayed and it prevents the formation of deep trenches because the wheels do not sink into dry soil. In FIG. 2, when the irrigation system is traveling in the B direction, the directional spray nozzles 20A on the A side automatically spray so that the water is hitting the soil after the wheels drive over the soil and no trenches are formed.

The advantage of the present invention is that the directional spray nozzles over the wheels are automatically switched with a change in direction of the irrigation main pipe so that the water only sprays behind the trailing wheels so that the wheels are always traveling over dry soil and do not create deep ruts.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
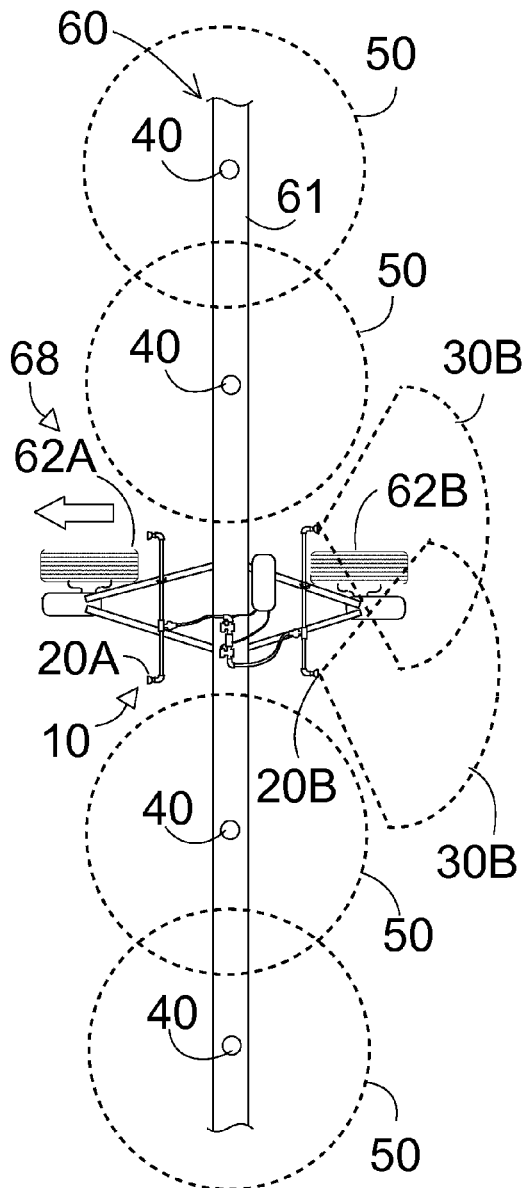
FIG. 1 is a partial top plan view of an irrigation main pipe showing the directional spray nozzles over the wheel on each side of the tower with the nozzles on only the B side spraying a partial circle pattern of water behind the trailing wheel and some of the standard circular spray nozzles not over the tower with the main pipe traveling in an A direction.
Figure 2:
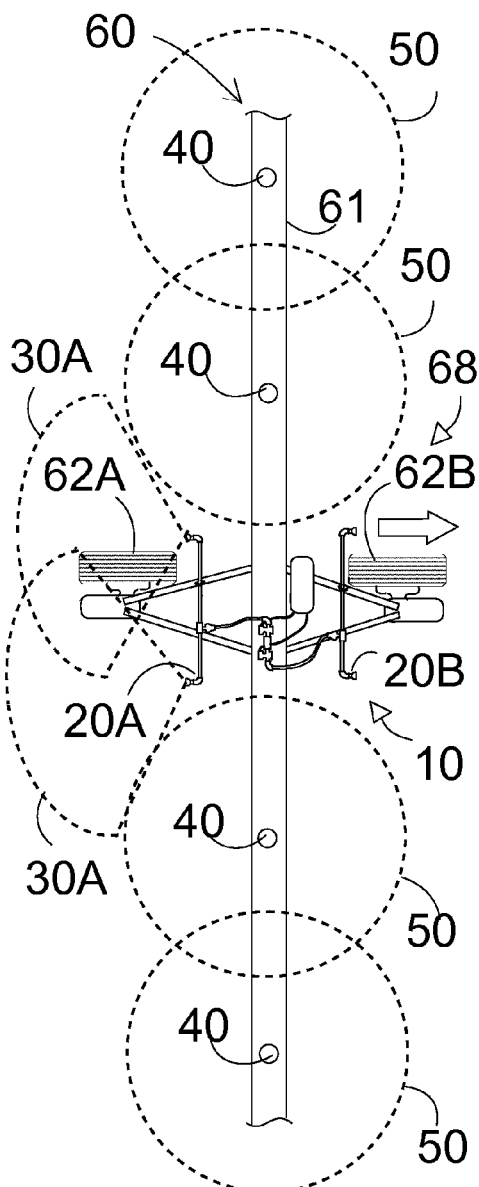
FIG. 2 is a partial top plan view of an irrigation main pipe showing the directional spray nozzles over the wheel on each side of the tower with the nozzles on only the A side spraying a partial circle pattern of water behind the trailing wheel and some of the standard circular spray nozzles not over the tower with the main pipe traveling in a B direction.
Figure 3:
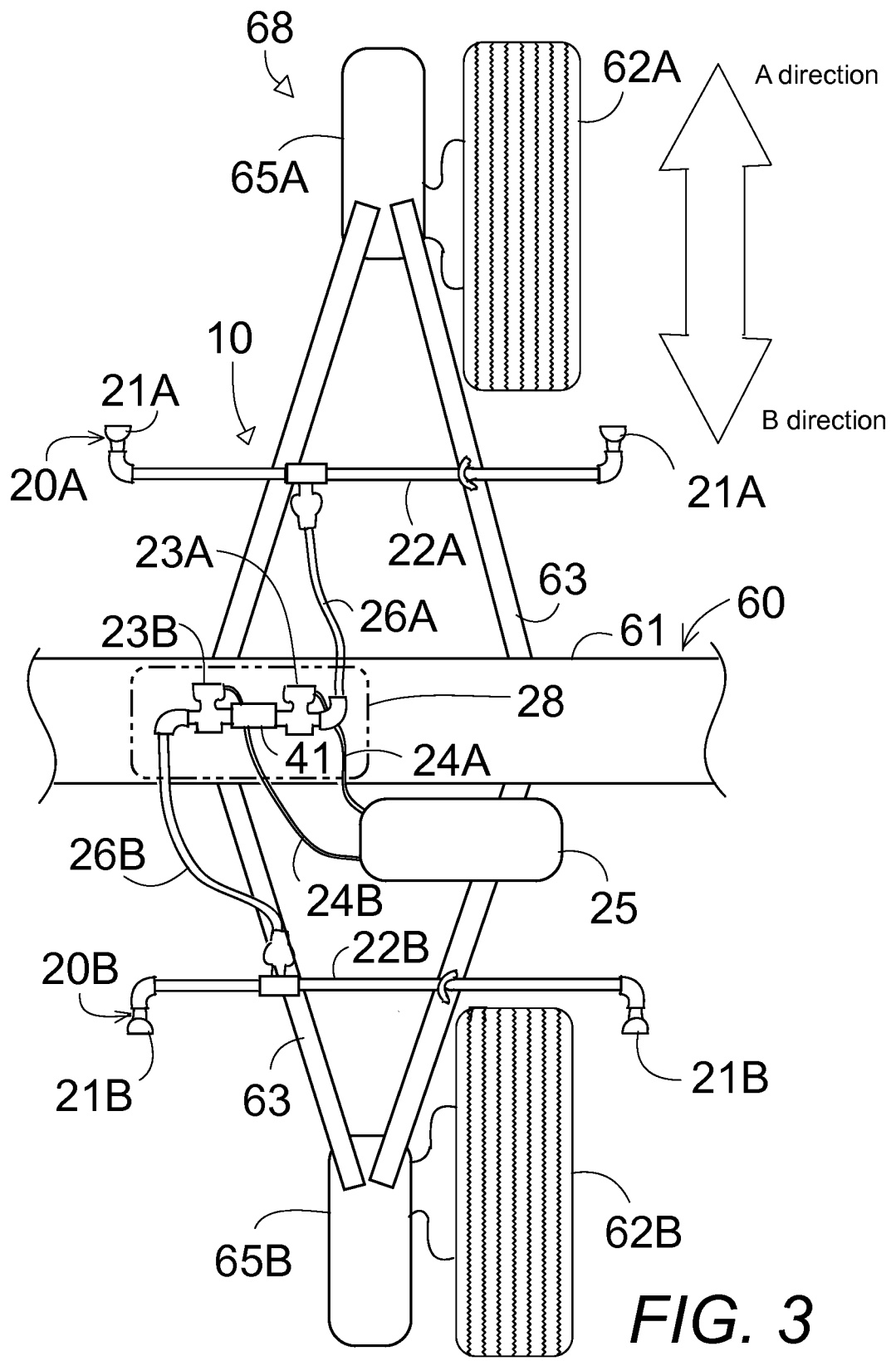
FIG. 3 is a partial top plan view of a tower on an irrigation main pipe showing the directional spray nozzles over the wheel on each side of the tower and the automatically switching solenoids connected to the water supply and wired to the tower box to automatically switch the flow of water to the spray nozzles over the trailing wheel of the tower when the main pipe changes direction.

In FIGS. 1-3, an automatic direction switching dry track directional spray device 10 sprays only behind the direction of travel of the wheels 62A and 62B for each tower of an irrigation system which travels in two directions, so that the wheels always travel over dry soil and do not create deep ruts in the soil.

A series of directional spray nozzle assemblies 20A an 20B are mounted on an irrigation system 60, which irrigation system travels in two opposite directions for watering a field. The existing irrigation system 60 comprising a series of spaced sprinklers 40 along a main pipe 61 or beam for watering a field. Each of the prior art sprinklers, shown in FIG. 4, normally comprises circular spray sprinklers 40 to create overlapping circular sprays 50 along the length of the main pipe to water an entire area covered by the main pipe 61, and at least one water distribution conduit 41 along the length of the main pipe to feed the sprinklers. The irrigation system further comprising a series of spaced towers 68 along the length of the main pipe, each tower 68 having at least one pair of wheels 62A and 62B linearly aligned in the direction of travel A or B so that a first wheel 62A leads a second wheel 62B in a first direction of travel A and the second wheel 62B leads the first wheel 62A in a second direction of travel B. Each of the wheels 62A and 62B is rotated by a wheel rotating device 65A and 65B, such as a motor, preferably an electric motor.

The irrigation system has a standard control box (not shown), located at an end of the main pipe which would be the center pivot end of a center-pivot main pipe, for controlling the direction of travel and a tower box 25 or connection box at each of the towers communicating with the control box. Each tower box having electrical components to create an electrical connection between the control box and the adjacent wheel rotating devices 65A and 65B, which may be gear boxes communicating with an electric motor under the pipe 61, at the tower 68 where the tower box is located.

The directional spray nozzle assemblies 20A and 20B of the present invention comprise at least one directional spray nozzle 21A and 21B, preferably two nozzles each, having at least one directional nozzle mounted on each of two opposite sides of each tower 68 in place of the normal circular spray nozzle.

The first directional spray nozzles 21A are mounted in proximity to the first wheel 62A and the second directional spray nozzles 21B are mounted in proximity to a second aligned wheel 62B on each of the towers.

In FIGS. 1 and 2, the second directional spray nozzle assembly 20B sprays water behind the second wheel 62B when the irrigation system is traveling in the first direction A with the first wheel 62A leading. The first directional spray nozzle assembly 20A sprays water behind the first wheel 62A when the irrigation system 60 is traveling in a second direction B with the second wheel 62B leading. No water is sprayed in front of the wheels in either direction of travel.

In FIG. 3, an automatic fluid switching apparatus for each of the at least one pair of directional spray nozzles at each tower 68 comprises at least one pair of fluid switching devices 23A and 23B, such as solenoid switches, attached to the at least one water distribution conduit 41 at each of the towers in place of a normal circular spray nozzle at each of the towers. The fluid switching devices 23A and 23B may be contained in a fluid switching housing 28.

A first fluid switching apparatus 23A of the at least one pair of fluid switching devices diverts water from the water distribution conduit 41 to the first directional water nozzle assembly 20A when the irrigation system is traveling in a second direction B to spray water behind the trailing first wheel 62A, as shown in FIG. 2. Alternately, the second fluid switching apparatus 23B diverts water from the water distribution conduit 41 to the second directional water nozzle assembly 20B when the irrigation system is traveling in a first direction A to spray water behind the trailing second wheel 62B, as shown in FIG. 1.

The automatic fluid switching apparatus 23A and 23B are connected by wires 24A and 24B to the electrical components in the tower box 25 leading to each of the wheel turning devices 65A and 65B which turn wheels 62A and 62B, so that a first connection automatically activates the first fluid switching apparatus 23A, such as a solenoid switch, when the second wheel rotating device 65B is activated to drive the second wheel 62B in the second direction B with the other switching apparatus not activated. The second connection automatically activates the second fluid switching apparatus 23B, such as a solenoid switch, when the first wheel rotating device 65A is activated to drive the first wheel 62A in the first direction A with the other switching apparatus not activated.

The first directional water nozzle assembly 20A comprises a first pair of directional spray nozzles 21A connected by a first spray pipe 22A and a first spray hose 26A to the first solenoid switch 23A and the second directional water nozzle assembly 20B comprises a second pair of directional spray nozzles 21B connected by a second spray pipe 22B and a second spray hose 26B to the second solenoid switch 23B.

Each of the pair of directional nozzles 21A and 21B comprises a directional spray nozzle covering a partial circle spray 30A and 30B of water behind the adjacent wheel away from the direction of travel when the adjacent wheel is trailing.

In use, a switching means switches the direction of travel of the irrigation system. The switching means comprises a central control box communicating with a tower box 25 or connection box located at each tower. The tower box 25 communicates with an electric motor under the pipe 61 to power the gear box 65A and 65B to turns the wheels 62A and 62B in a direction A or a direction B. The switching solenoids 23A and 23B at each tower 68, wired into the tower box 25 at that tower, automatically switch the directional spray nozzles 21A and 21B to spray a partial circle of water 30A and 30B behind the trailing wheel at each tower. When the center-pivot or linear irrigation system changes direction, the present invention switches the spray heads to spray behind the trailing wheel so the wheels are always traveling over dry soil with the water sprayed behind the trailing wheel.

In FIG. 1, when the irrigation structure is traveling in the A direction, the directional spray nozzles 20B on the B side automatically spray so that the water is sprayed behind the direction of travel of the wheels and both wheels are traveling over dry soil before it is sprayed and it prevents the formation of deep trenches because the wheels do not sink into dry soil. In FIG. 2, when the irrigation system is traveling in the B direction, the directional spray nozzles 20A on the A side automatically spray so that the water is hitting the soil after the wheels drive over the soil and no trenches are formed.

Figure 4:
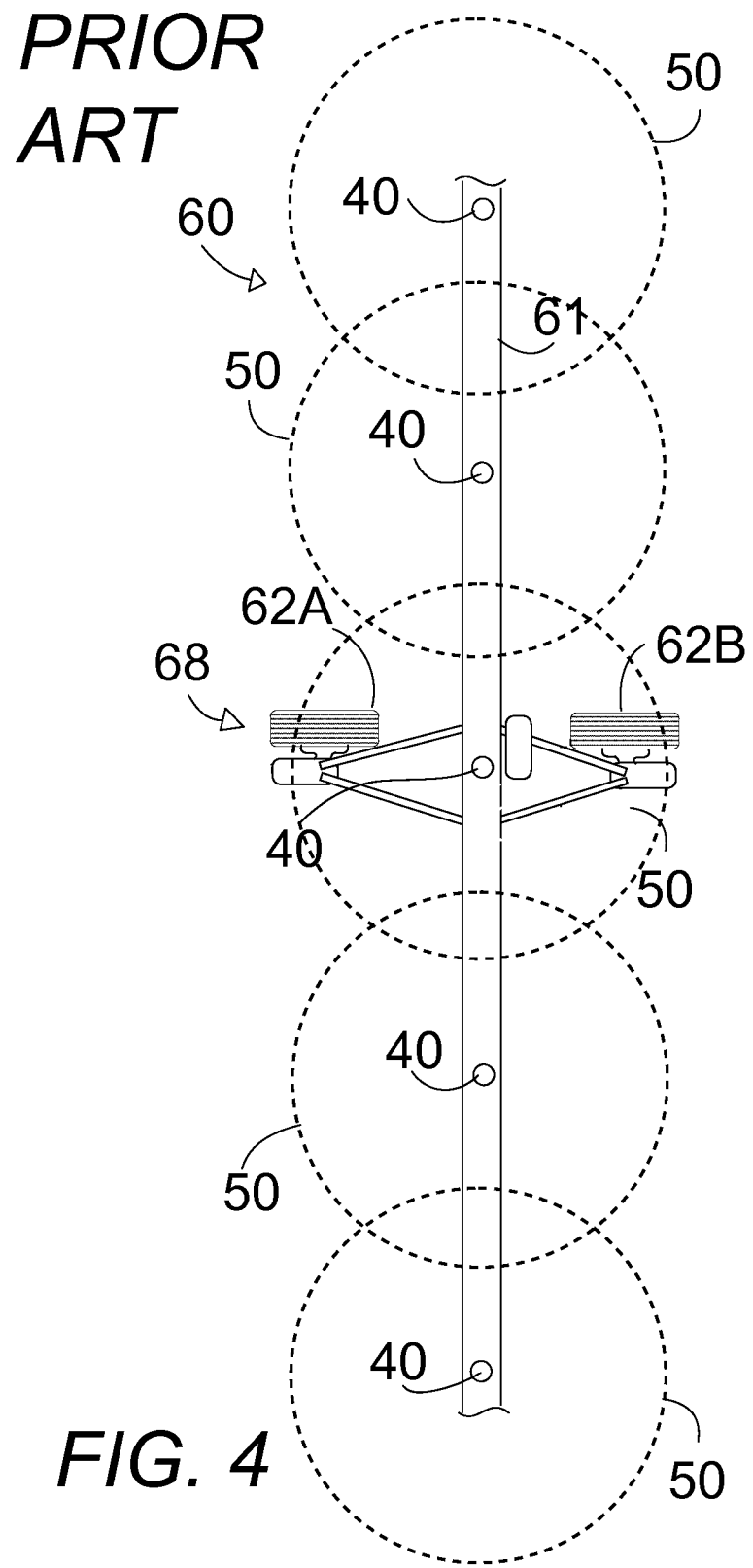
FIG. 4 is a partial top plan view of a prior art irrigation main pipe showing the standard circular spray nozzles not over the entire main pipe including the towers so that water sprays in front of the wheels so that the wheels make ruts in the wet soil.

In FIG. 3, the automatic direction switching dry track directional spray device 10 of the present invention, is attached to the existing prior art pivot irrigation structure 60 over the wheels in place of the normal circular spray 40 at each tower, as shown in the Prior Art of FIG. 4. These center-pivot irrigation systems and linear irrigation systems each have a long main pipe 61 which stretches out from the center of the field with circular spray nozzles 40 which create overlapping circular spray patterns 50 of water to irrigate the entire field as the main pipe 61 makes a complete circle around the center pivot point or travels linearly across the field. The series of linearly aligned paired wheels 62A and 62B with motors 65A and 65B in the towers 68 spaced along the length of the main pipe 61 drive the main pipe around the field or across the field. When the field is dry and needs water the system is turned on to move the main pipe to water the dry field. Then after the field dries out again, the system is turned on to travel in the opposite direction to travel back over the field in the opposite direction to water the entire field. In the prior art system of FIG. 4 the prior art circular spray nozzles 40 wet the soil in front of and around the wheels, so that the wheels create deep ruts or trenches in the wet soil. With the present invention the wheels are always traveling on dry soil so that the wheels do not sink in and do not make ruts or trenches in the field.

The circular spray nozzles 40 along the length of the main pipe 61 and the directional spray nozzle assemblies 20A and 20B of the present invention completely water the field, but the wheels travel on dry soil because the directional spray nozzles 21A and 21B which only spray 90 to 220 degrees, instead of 360 degrees like the other nozzles 40 and the directional water pattern 30A and 30B is always behind the wheels. The solenoids 23A and 23B are attached to the existing spout 41 which would normally have a circular nozzle. When the tower box 25 changes activates the motors 65A and 65B to drive the wheels in a direction A or direction B, the correct solenoid 23A or 23B is automatically activated to direct the water through the correct spray hose 26A or 26B to the correct directional spray assembly 20A or 20B with the water going through the correct spray pipe 22A or 22B to the correct directional spray nozzle 21A or 21B so that the water is always being sprayed behind the direction of travel of the wheels.

It is understood that the preceding description is given merely by way of illustration and not in limitation of the invention and that various modifications may be made thereto without departing from the spirit of the invention as claimed.

What is claimed is:

1. An automatic direction switching dry track directional spray device for each tower of an irrigation system which travels in two directions, the apparatus comprising:

a series of directional spray nozzles mounted on an irrigation system, which irrigation system travels in two opposite directions for watering a field, the irrigation system comprising a series of spaced sprinklers along a main pipe for watering a field, each of the sprinklers normally comprising circular spray sprinklers to create overlapping circular sprays along the length of the main pipe to water an entire area covered by the main pipe and at least one water distribution conduit along the length of the main pipe to feed the sprinklers, the irrigation system further comprising a series of spaced towers along the length of the main pipe, each tower having at least one pair of wheels linearly aligned in the direction of travel so that a first wheel leads a second wheel in a first direction of travel and the second wheel leads the first wheel in a second direction of travel, each of the wheels rotated by a wheel rotating device, the irrigation system having a control box for controlling the direction of travel and a tower box at each of the towers communicating with the control box, each tower box having electrical components to create an electrical connection between the control box and the adjacent wheel rotating devices of the tower where the tower box is located, the directional spray nozzles comprising at least one pair of directional spray nozzles having at least one directional nozzle mounted on each of two opposite sides of each tower in place of the normal circular spray nozzle, the at least one directional spray nozzle comprising at least one first directional spray nozzle mounted in proximity to the first wheel and at least one second directional spray nozzle mounted in proximity to a second aligned wheel on each of the towers, the at least one second directional spray nozzle spraying water behind a second wheel when the irrigation system is traveling in a first direction with the first wheel leading and the at least one first directional spray nozzle spraying water behind a first wheel when the irrigation system is traveling in a second direction with the second wheel leading and no water sprayed in front of the wheels in the direction of travel;

an automatic fluid switching apparatus for each of the at least one pair of directional spray nozzles at each tower, the automatic fluid switching apparatus comprising at least one pair of fluid switched devices attached to the at least one water distribution conduit at each of the towers in place of a normal circular spray nozzle at each of the towers, a first fluid switching apparatus of the at least one pair of fluid switching devices diverting water from the at least one water distribution conduit to the at least one first directional water nozzle when the irrigation system is traveling in a second direction to spray water behind the trailing first wheel and alternately a second fluid switching apparatus of the at least one pair of switching apparatus to the at least one second directional water nozzle when the irrigation system is traveling in a first direction to spray water behind the trailing second wheel, the automatic fluid switching apparatus communicating with the electrical components in the tower box so that a first connection automatically activates the first fluid switching apparatus when the second wheel rotating device is activated to drive the second wheel in the second direction and a second connection automatically activates the second fluid switching apparatus when the first wheel rotating device is activated to drive the first wheel in the first direction to create an automatic direction switching dry track directional spray device for each tower of an irrigation system which travels in two directions.

2. The device of claim 1 wherein the first fluid switching apparatus comprises a first solenoid switch wired to an electrical connection for activating the first wheel rotating device and the second fluid switching apparatus comprises a second solenoid switch wired to an electrical connection for activating the second wheel rotating device.

3. The device of claim 2 wherein the at least one first directional water nozzle comprises a first pair of directional nozzles connected by a first pair of water hoses to the first solenoid switch and the at least one second directional water nozzle comprises a second pair of directional nozzles connected by a second pair of water hoses to the second solenoid switch.

4. The device of claim 3 wherein each of the pair of directional nozzles comprises a directional nozzle covering a partial circle spray of water behind the adjacent wheel away from the direction of travel when the adjacent wheel is trailing.

* * * * *